US008712850B1

(12) United States Patent
Raghunathan et al.

(10) Patent No.: US 8,712,850 B1
(45) Date of Patent: Apr. 29, 2014

(54) PROMOTING CONTENT

(75) Inventors: Vivek Raghunathan, Fremont, CA (US); David G. Arthur, Mountain View, CA (US); Rohan Jain, New York, NY (US); Emily K. Moxley, San Francisco, CA (US); Shivakumar Venkataraman, Santa Clara, CA (US); Nipun Kwatra, Bangalore (IN); Brett A. McLarnon, Mountain View, CA (US); David J. Ganzhorn, Mountain View, CA (US)

(73) Assignee: Google Inc., Mountain View, CA (US)

( * ) Notice: Subject to any disclaimer, the term of this patent is extended or adjusted under 35 U.S.C. 154(b) by 147 days.

(21) Appl. No.: 13/472,077

(22) Filed: May 15, 2012

Related U.S. Application Data

(60) Provisional application No. 61/594,907, filed on Feb. 3, 2012.

(51) Int. Cl.
*G06Q 30/00* (2012.01)
(52) U.S. Cl.
USPC ................... 705/14.72; 705/14.54; 705/14.71
(58) Field of Classification Search
CPC .......... G06Q 30/0256; G06Q 30/0275; G06Q 30/0276
USPC ................................. 705/14.54, 14.71, 14.72
See application file for complete search history.

(56) References Cited

U.S. PATENT DOCUMENTS

| | | | |
|---|---|---|---|
| 7,363,302 B2 | 4/2008 | Lester | |
| 8,214,261 B2 | 7/2012 | Chen et al. | |
| 2002/0194066 A1 | 12/2002 | Shultz | |
| 2004/0267806 A1 | 12/2004 | Lester | |
| 2006/0031187 A1 | 2/2006 | Pyrce et al. | |
| 2007/0011142 A1 | 1/2007 | Sattler et al. | |
| 2008/0052161 A1 | 2/2008 | Cohen et al. | |
| 2008/0288325 A1* | 11/2008 | Pavlov | 705/10 |
| 2008/0319944 A1 | 12/2008 | Venolia et al. | |
| 2009/0006358 A1 | 1/2009 | Morris et al. | |
| 2009/0055266 A1 | 2/2009 | Brody et al. | |
| 2009/0287672 A1* | 11/2009 | Chakrabarti et al. | 707/5 |

(Continued)

FOREIGN PATENT DOCUMENTS

| | | |
|---|---|---|
| EP | 0287858 | 10/1988 |
| EP | 1143340 | 10/2001 |

(Continued)

OTHER PUBLICATIONS

Lyons, Ken "Keyword Optimization: Why Optimizing for the Right Keywords is 'Do or Die'", Apr. 14, 2010, downloaded Nov. 16, 2013 from http://www.wordstream.com/blogs/ws/2010/04/14/keyword-optimization.*

*Primary Examiner* — Donald L. Champagne
(74) *Attorney, Agent, or Firm* — Fish & Richardson P.C.

(57) ABSTRACT

Methods, systems, and apparatus, including computer programs encoded on a computer-readable storage medium, and including a computer-implemented method for providing a creative. The method comprises identifying, using one or more processors, a creative for processing, the creative including a title portion, a body portion and optionally a reference portion. The method further comprises evaluating the body portion including determining when the body portion includes one or more words that can be added to the title portion. The method further comprises promoting, using the one or more processors, the one or more words into the title portion. The method further comprises providing the creative including the title portion with the promoted one or more words.

96 Claims, 6 Drawing Sheets

(56) References Cited

U.S. PATENT DOCUMENTS

| | | |
|---|---|---|
| 2009/0300139 A1 | 12/2009 | Shoemaker et al. |
| 2010/0131384 A1 | 5/2010 | Chen et al. |
| 2010/0324993 A1 | 12/2010 | Kacholia et al. |
| 2011/0196746 A1* | 8/2011 | Tang et al. ............... 705/14.71 |
| 2012/0158494 A1 | 6/2012 | Reis et al. |
| 2012/0253927 A1* | 10/2012 | Qin et al. ............... 705/14.49 |

FOREIGN PATENT DOCUMENTS

| | | |
|---|---|---|
| WO | WO 01/16683 | 3/2001 |
| WO | WO 01/16694 | 3/2001 |
| WO | WO 2005/006282 | 1/2005 |
| WO | WO 2008/144772 | 11/2008 |
| WO | WO 2010/054201 | 5/2010 |
| WO | WO 2010/104914 | 9/2010 |

* cited by examiner

300

```
┌─────────────────────────────────────────────────────────────────┐
│ Identify a creative for processing that includes a title portion,│
│ a body portion, and optionally a reference portion              │
│                                                            302  │
└─────────────────────────────────────────────────────────────────┘
                                │
                                ▼
┌─────────────────────────────────────────────────────────────────┐
│ Evaluate the body portion including determining when the body   │
│ portion includes one or more words that can be added to the     │
│ title portion                                                   │
│                                                            304  │
└─────────────────────────────────────────────────────────────────┘
                                │
                                ▼
┌─────────────────────────────────────────────────────────────────┐
│ Promote the one or more words into the title portion            │
│                                                            306  │
└─────────────────────────────────────────────────────────────────┘
                                │
                                ▼
┌─────────────────────────────────────────────────────────────────┐
│ Provide the creative including the title portion with the       │
│ promoted one or more words                                      │
│                                                            308  │
└─────────────────────────────────────────────────────────────────┘
```

```
Receive a creative associated with an advertisement, where the creative includes
a title, a second line of text, a third line of text, and optionally a reference portion
                                                                            342
```

↓

```
Determine when the second line of text can be promoted into the title, including
          determining when the second line of text constitutes a sentence
                                                                            344
```

↓

```
Promote the second line of text into the title when the second line of text
constitutes a sentence, and modify the title to append the second line of text to the
                                       title
                                                                            346
```

↓

```
Provide the creative including the title with promoted second line of text
                                                                            348
```

FIG. 3C

PROMOTING CONTENT

CROSS-REFERENCE TO RELATED APPLICATIONS

This application claims priority under 35 U.S.C. §119(e)(1), to U.S. Provisional Application Ser. No. 61/594,907, entitled "Promoting Content" filed on Feb. 3, 2012, the entire contents of which are incorporated herein by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or to a request that is received for the sponsored content. The content can then be provided to the user on any devices associated with the user such as a home personal computer (PC), a smartphone, a laptop computer, a tablet computer, or some other user device.

SUMMARY

In general, one innovative aspect of the subject matter described in this specification can be implemented in methods that include a computer-implemented method for providing a creative. The method comprises identifying, using one or more processors, a creative for processing, the creative including a title portion, a body portion and optionally a reference portion. The method further comprises evaluating the body portion including determining when the body portion includes one or more words that can be added to the title portion. The method further comprises promoting, using the one or more processors, the one or more words into the title portion. The method further comprises providing the creative including the title portion with the promoted one or more words.

These and other implementations can each optionally include one or more of the following features. The method can further comprise receiving a request for content, and providing the creative responsive to the request. The body portion can include two lines of text. The title portion can constitute a first line of text, and the body portion can include second and third lines of text, and evaluating the body portion can include evaluating the second line of text to identify the one or more words. Evaluating the second line can include identifying when the second line of text constitutes a sentence and promoting the second line into the title portion when the second line constitutes a sentence. Evaluating the body portion can include evaluating text in the third line to determine when the second line constitutes a sentence and promoting the second line into the title portion when the second line constitutes a sentence. Evaluating the second line can include determining when the second line ends with an end-of-line punctuation mark, and when so, promoting the entire second line into the title portion. Promoting the one or more words into the title portion can include appending the one or more words to the end of the title portion. Promoting the one or more words can further include adding a delimiter to the title portion between text of the title portion and the promoted one or more words. The delimiter can separate the text of the title portion from the promoted one or more words. Promoting the one or more words can include constructing a link for the title portion after promotion. The link can be directed to a first resource. The reference portion can be directed to a second different resource. The one or more words can be a phrase. The one or more words can embody a concept. The one or more words can embody a call to action associated with the creative. Providing can include storing the creative. Providing can include providing the creative responsive to a received request for a creative to fill a slot. Evaluating the body portion can include evaluating text of the body portion at a beginning of the body portion for promotion. Evaluating the body portion can include evaluating text of the body portion at a location other than a beginning of the body portion for promotion. Evaluating the body portion can include determining when, if promoted, the one or more words would violate one or more predetermined restrictions on promotion and not promoting the one or more words if a violation would occur. One predetermined restriction can relate to a length of the title portion. One predetermined restriction can relate to content that can be included in the title portion. One predetermined restriction can relate to policy restrictions. The method can further comprise determining when promotion should occur including evaluating one or more metrics associated with the creative or delivery of the creative. One metric can relate to a location of where the creative is to be served. One metric can relate to a user to whom the creative is to be displayed. One metric can relate to an environment associated with the serving of the creative. One metric can relate to a relative projected performance of the creative with and without content added to the title portion. Providing the creative can include providing estimated performance information for the creative. Providing the estimated performance information for the creative can include providing a relative performance change projection. Evaluating the body portion can include determining a likelihood that the body portion includes a first line of text that constitutes a sentence, and promoting the first line of text when the likelihood is above a first threshold.

In general, another innovative aspect of the subject matter described in this specification can be implemented in methods that include a computer-implemented method for providing an advertisement. The method comprises receiving, using one or more processors, a request for content, wherein the content is of a form of an advertisement. The method further comprises identifying an eligible advertisement from an inventory of advertisements. The method further comprises receiving a creative associated with the eligible advertisement wherein the creative includes a title, at least one line of additional text and optionally a reference portion. The method further comprises determining a portion of text from the at least one line of additional text to promote into the title including a portion beginning with text at a beginning of a first of the at least one line of additional text. The method further comprises promoting, using the one or more processors, the portion of text into title. The method further comprises adjusting a remainder of the creative based on the promoted portion. The method further comprises providing the advertisement responsive to the request including providing the creative including the title with the promoted portion.

These and other implementations can each optionally include one or more of the following features. The at least one line of additional text can include two lines of text. The title can constitute a first line of text of the advertisement, and the at least one line of additional text can include second and third lines of text of the advertisement, and wherein determining a portion of text from the at least one line of additional text to promote into the title can include evaluating the second line of text to identify the one or more words. Determining the portion of text from the at least one line of additional text to promote into the title can include identifying when the second line of text constitutes a sentence and promoting the second line into the title when the second line constitutes a sentence. Determining a portion of text from the at least one line of additional text to promote into the title can include evaluating text in the third line to determine when the second line constitutes a sentence and promoting the second line into the title when the second line constitutes a sentence. Evaluating the second line can include determining when the second line ends with an end-of-line punctuation mark, and when so, promoting the entire second line into the title. Promoting the one or more words into the title can include appending the one or more words to the end of the title. Promoting the one or more words can further include adding a delimiter to the title between text of the title and the promoted one or more words. The delimiter can separate the text of the title from the promoted one or more words. Promoting the one or more words can include constructing a link for the title after promotion. The link can be directed to a first resource. The reference portion can be directed to a second different resource. The one or more words can be a phrase. The one or more words can embody a concept. The one or more words can embody a call to action associated with the advertisement. Providing can include storing the advertisement. Providing can include providing the advertisement responsive to a received request for a creative to fill a slot. Determining a portion of text from the at least one line of additional text to promote into the title can include evaluating the at least one line of additional text at a beginning of the at least one line of additional text for promotion. Determining a portion of text from the at least one line of additional text to promote into the title can include evaluating the at least one line of additional text at a location other than a beginning of the at least one line of additional text for promotion. Evaluating the at least one line of additional text can include determining when, if promoted, the one or more words would violate one or more predetermined restrictions on promotion and not promoting the one or more words if a violation would occur. One predetermined restriction can relate to a length of the title. One predetermined restriction can relate to content that can be included in the title. One predetermined restriction can relate to policy restrictions. The method can further comprise determining when promotion should occur including evaluating one or more metrics associated with the advertisement or delivery of the advertisement. One metric can relate to a location of where the advertisement is to be served. One metric can relate to a user to whom the advertisement is to be displayed. One metric can relate to an environment associated with the serving of the advertisement. One metric can relate to a relative projected performance of the advertisement with and without content added to the title. Providing the advertisement can include providing estimated performance information for the advertisement. Providing the estimated performance information for the advertisement can include providing a relative performance change projection. Evaluating the at least one line of additional text can include determining a likelihood that the at least one line of additional text includes a first line of text that constitutes a sentence, and promoting the first line of text when the likelihood is above a first threshold.

In general, another innovative aspect of the subject matter described in this specification can be implemented in methods that include a computer-implemented method for providing a creative. The method further comprises receiving a creative associated with an advertisement wherein the creative can include a title, a second line of text, a third line of text and optionally a reference portion. The method further comprises determining, using one or more processors, when the second line of text can be promoted into the title including determining when the second line of text constitutes a sentence. The method further comprises promoting, using the one or more processors, the second line of text into the title when the second line of text constitutes a sentence including modifying the title to append the second line of text to the title. The method further comprises providing the creative including the title with promoted second line of text.

These and other implementations can each optionally include one or more of the following features. The method can further comprise receiving a request for content, and providing the creative responsive to the request. The body portion can include two lines of text. The title portion can constitute a first line of text, and the body portion can include second and third lines of text, and wherein evaluating the body portion can include evaluating the second line of text to identify the one or more words. Evaluating the second line can include identifying when the second line of text constitutes a sentence and promoting the second line into the title portion when the second line constitutes a sentence. Evaluating the body portion can include evaluating text in the third line to determine when the second line constitutes a sentence and promoting the second line into the title portion when the second line constitutes a sentence. Evaluating the second line can include determining when the second line ends with an end-of-line punctuation mark, and when so, promoting the entire second line into the title portion. Promoting the one or more words into the title portion can include appending the one or more words to the end of the title portion. Promoting the one or more words further includes adding a delimiter to the title portion between text of the title portion and the promoted one or more words. The delimiter can separate the text of the title portion from the promoted one or more words. Promoting the one or more words can include constructing a link for the title portion after promotion. The link can be directed to a first resource. The reference portion can be directed to a second different resource. The one or more words can be a phrase. The one or more words can embody a concept. The one or more words can embody a call to action associated with the creative. Providing can include storing the creative. Providing can include providing the creative responsive to a received request for a creative to fill a slot. Evaluating the body portion can include evaluating text of the body portion at a beginning of the body portion for promotion. Evaluating the body portion can include evaluating text of the body portion at a location other than a beginning of the body portion for promotion. Evaluating the body portion can include determining when, if promoted, the one or more words would violate one or more predetermined restrictions on promotion and not promoting the one or more words if a violation would occur. One predetermined restriction can relate to a length of the title portion. One predetermined restriction can relate to content that can be included in the title portion. One predetermined restriction can relate to policy restrictions. The method can further comprise determining when promotion should occur including evaluating one or more metrics associated with the creative or delivery of the creative. One metric can relate to a location of where the creative is to be served. One metric can relate to a user to whom the creative is to be displayed. One metric can relate to an environment associated with the serving of the creative. One metric can relate to a relative projected performance of the creative with and without content added to the title portion. Providing the creative can include providing estimated performance information for the creative. Providing the estimated performance information for the creative can include providing a relative performance change projection. Evaluating the body portion can include determining a likelihood that the body portion includes a first line of text that constitutes a sentence, and promoting the first line of text when the likelihood is above a first threshold.

In general, another innovative aspect of the subject matter described in this specification can be implemented in systems that include a content management system for providing content. The content management system includes an identification engine that identifies a content item for processing, the content item including a title portion, a body portion and optionally a reference portion. The content management system further includes an evaluation engine that evaluates the body portion, including determining when the body portion includes one or more words that can be added to the title portion. The content management system further includes a promotion engine that promotes the one or more words into the title portion. The content management system further includes a request handler for providing the content item in response to a request for content by the user.

These and other implementations can each optionally include one or more of the following features. The content item can be an advertisement creative.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A is a flowchart of an example process for promoting one or more words in a creative.

FIG. 3C is a flowchart of an example process for providing a creative with promoted text.

Like reference numbers and designations in the various drawings indicate like elements.

DETAILED DESCRIPTION

Figure 1:
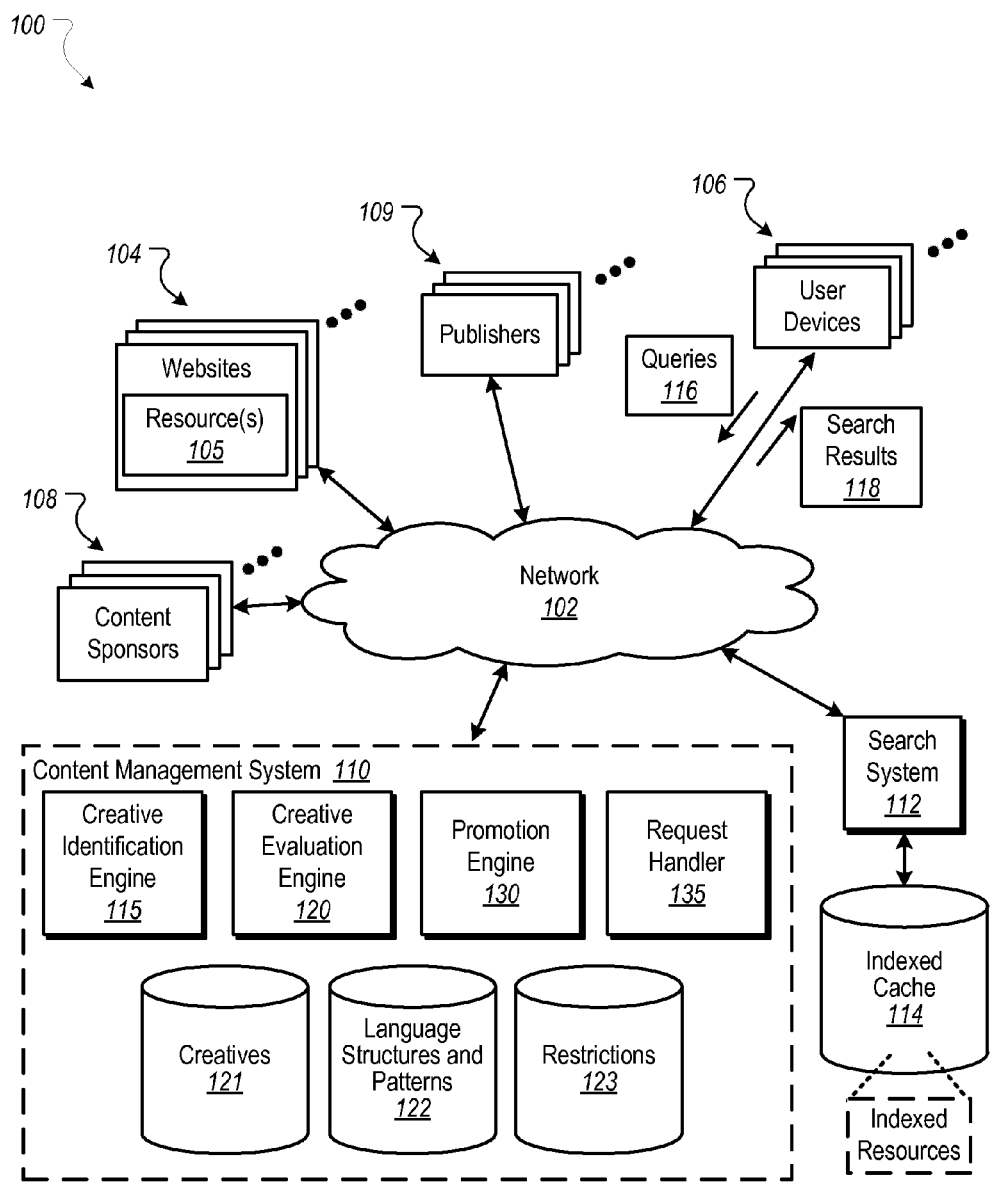
FIG. 1 is a block diagram of an example environment for delivering content.

This document describes methods, apparatuses and systems for promoting information in a content item to a different (e.g., higher or more prominent) location within the content item. A content item can be of the form of an advertisement. While reference is made to an advertisement, other forms of sponsored content are possible. A content item includes targeting criteria (i.e., specifying when the content item is shown) and a creative (i.e., what is shown). As used here, content refers to subject matter that is requested by a user/device and delivered responsive to a content request. Content is also used to refer to the portion of a creative that is promoted, e.g., to the title portion. For example, advertisement text in an advertisement creative (or, also, "creative") can be promoted to the first (or title) line of the creative. One example of promotable content is the second line of the creative which may include one or more words that make up a phrase or a complete sentence that ends in an end-of-line punctuation mark. Other content or portion of the creative can also be promoted. Promotion of content may be intended to occur only in specific cases, such as when the promotion is most likely to have a positive result, e.g., by improving the experience and/or likelihood of an engagement by the user to whom the content is provided.

In some implementations, creatives can include plural individual elements. For example, a creative can include a title portion, a body portion (e.g., two lines of text), and a reference portion. The title portion can occupy the first, top or most prominent position of the creative. The title portion can be presented in a different font, bolded, or otherwise emphasized relative to the remaining portions of the creative. In some implementations, the title portion is one line of text and is of the form of an actionable item (e.g., is a link to a landing page associated with the creative). The body portion can include, for example, plural lines of text (e.g., two) and be positioned in a second location (e.g., middle) of the creative (e.g., just below the title portion). The reference portion of the creative includes a reference to a resource associated with the creative (e.g., a reference to a landing page associated with the creative). In some implementations, no reference portion is included in a creative. In some implementations, the reference portion can be of the form of a visual uniform resource locator (URL) or display URL. In some implementations the reference portion occupies a third location (e.g., bottom) of the creative, such as just beneath the body portion. While reference is made to top, middle and bottom locations above with respect to a creative, other orientations are possible for configuring the respective elements. In some implementations, other elements can be included in a creative.

The body portion of a creative can be evaluated, for example, to determine when the body portion includes content (e.g., one or more words) that can be added to the title portion. For example, the title portion of the creative provided by a content sponsor may initially include only the name of the product or service associated with the creative. At the same time, the body portion may include descriptive text or other information that, if promoted to the title portion, may make the creative more likely to catch the user's attention. In some implementations, the content promoted from the body portion can include words located entirely within the second line. In some implementations, promotion of content from the body portion can include content from different portions of the creative (e.g., from the body portion and reference portion) or different sections of a single portion (e.g., from multiple lines of the body portion). In some implementations, promotion can include promotion in other locations of the creative (e.g., promotion within the body portion or promotion of content from the reference portion to either the body portion or title portion). After content (e.g., the one or more words) is promoted, the creative can be provided, e.g., in response to a request for content such as a request to fill an ad slot. In some implementations, creatives in which content is promoted can be provided (e.g., as suggestions) to content sponsors in user interfaces they use to create and update creatives.

The act of promoting can, for example, move or copy content from one portion of the creative to another. For example, promoting can include moving or copying content to the title portion from other portions of the creative. For example, if an entire second line of the creative is promoted, then the original second line can be removed from the creative. Other content can be shifted (e.g., moving the third line of content into the second line position or moving the reference portion into the second line position). In some implementations, content (e.g., a phone number) can be promoted by copying the information to the title portion while not removing the information from its source.

In some implementations, promoting content can occur conditionally or only after the content is modified in some way, e.g., to remove redundant or unnecessary information. A check can be performed to determine if candidate promotion content is already included in the target location (e.g., in the original title). When promotion would result in redundant information presentation, the promotion can be blocked or candidate promotion content can be modified. This can prevent the occurrence of blank spaces, unnecessary capitalization, repeated words and/or phrases in the title portion after promotion has occurred.

While the example of an advertisement creative and promotion of words is used in this document, promotion can occur in other types of content items and include other types of content. In some implementations, in addition to promotion of portions of the creative, some portions of the creative can be demoted, e.g., if they are determined to be less likely of interest to the user or for other reasons. In some implementations, additional content can be created and added to or replace existing content of a particular creative.

FIG. 1 is a block diagram of an example environment 100 for delivering content items. The example environment 100 includes a content management system 110 for selecting and providing content items in response to requests. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The content management system 110 can manage and provide content items, such as advertisement, or other resources. The content management system 110 and its subordinate parts can be implemented in any of several different locations and inter-connected using the network 102.

In some implementations, the example environment 100 and/or the content management system 110 further includes plural engines. A creative identification engine 115 can identify a content item (e.g., an advertisement including its respective creative) for processing. A creative evaluation engine 120 can evaluate a body portion of the creative, for example, to determine when the body portion includes one or more words that can be added to the title portion. A promotion engine 130 can promote the content (e.g., one or more words) into the title portion. A request handler 135 can provide the content item in response to a request for content by the user. Other engines and other functions are possible, e.g., to determine and promote visual universal resource locators (URLs), to base promotion of content at least in part on probabilities using n-gram analysis, and to prevent the presentation of redundant information as a result of promotion.

For example, some implementations of promoted content can include a visual URL or other reference that is contained in the reference portion of the creative. When promoting a URL, for example, the entire URL can be promoted, or the URL can be simplified or truncated to remove all but the domain information. For example, if the reference portion of the creative contains the URL www.exampleshoes.com/index/XYZ, then the promoted portion can be www.exampleshoes.com. In some implementations, the promoted portion of a URL can remove the reference to the world wide web (e.g., the "www").

In some implementations, whether or not content (e.g., one or more words) is promoted can depend, at least in part, on analyzing the creative including performing n-gram analysis. For example, the n-gram analysis can include the use of probabilities that one-, two- and/or three-word combinations of words are likely to include an end-of-line punctuation mark and/or lead to identification of a complete concept, phrase or sentence. In some implementations, the n-gram analysis can be used to promote content that spans multiple lines (e.g., two lines in the body portion), or to recognize (e.g., using probabilities) that the inclusion (or exclusion) of an end-of-line punctuation mark does (or does not) indicate a complete concept, phrase or sentence that can be promoted. In some implementations, the n-gram analysis can include the use of scores or probability formulas that use products of probabilities that correspond to various n-grams associated with one or more words that may be promoted. In some implementations, the promotion analysis can include analysis of the words and structure of the creative, for example to determine parts of speech, capitalization and explicit and implicit punctuation. Other analysis is possible.

The environment 100 can include plural data stores. In some implementations, a data store of creatives 121 can store creatives that are provided by content sponsors 108. The creatives, for example, can be in the original form provided by the content sponsors 108, i.e., without having any of the content in the creatives promoted to other parts of the creative (e.g., the title portion). In some implementations, the creatives 121 can also store creatives in which content has been promoted (e.g., by promoting a full sentence to the title portion of the creative). In some implementations, the data store of creatives 121 can store different versions of the same creative, e.g., one in the form that is originally provided by the content sponsor 108, and one or more versions of the creative in which content has been promoted.

Other example data stores can relate to language-specific information. In some implementations, a data store of language structures and patterns 122 can store information that can be used to evaluate content for possible promotion. For example, language structures and patterns 122 can store a domain of possible end-of-line punctuation marks (e.g., a period, exclamation point, question mark, or other punctuation mark(s)). In some implementations the language structures and patterns 122 can store information that can be used to detect false positives that result from end-of-sentence punctuation marks occurring at the end of a sentence. For example, if a period is included in a creative and is part of an abbreviation (e.g., Nov., U.S., etc.), then the period may not signal an end of the sentence, and therefore promotion of the entire line may not be appropriate. In some implementations, the language structures and patterns 122 or a different data store can store information about parts of speech and n-grams.

In some implementations, a data store of restrictions 123 can store information that can identify when to restrict the promotion of content. For example, one type of restriction can relate to the length of a title, e.g., the restriction having the meaning "do not promote content if the resulting title would exceed a threshold length of N characters or occupies S horizontal space." Other example restrictions can relate to content that should not be included in the title portion (e.g., certain words, phrases, product names, etc.) and policy restrictions (e.g., policies that designate that trademark names are not to appear on the first line of a creative). In some implementations, content- and policy-related restrictions can be different for each content sponsor. Other types of restrictions can be used.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can access the cache and/or the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content items are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content items that are eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by providing a content item (e.g., an advertisement) in which selected content has been promoted to the first line (or title portion) of the content item. For example, if a complete sentence (e.g., a call to action) or a reference appears in the title portion, the user may be more likely to engage with the content item, and that engagement can lead to a conversion.

For situations in which the systems discussed here collect personal information about users, the users may be provided with an opportunity to opt in/out or otherwise accept privacy policies relating to the collection of such data. In addition, certain data may be anonymized in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 2:
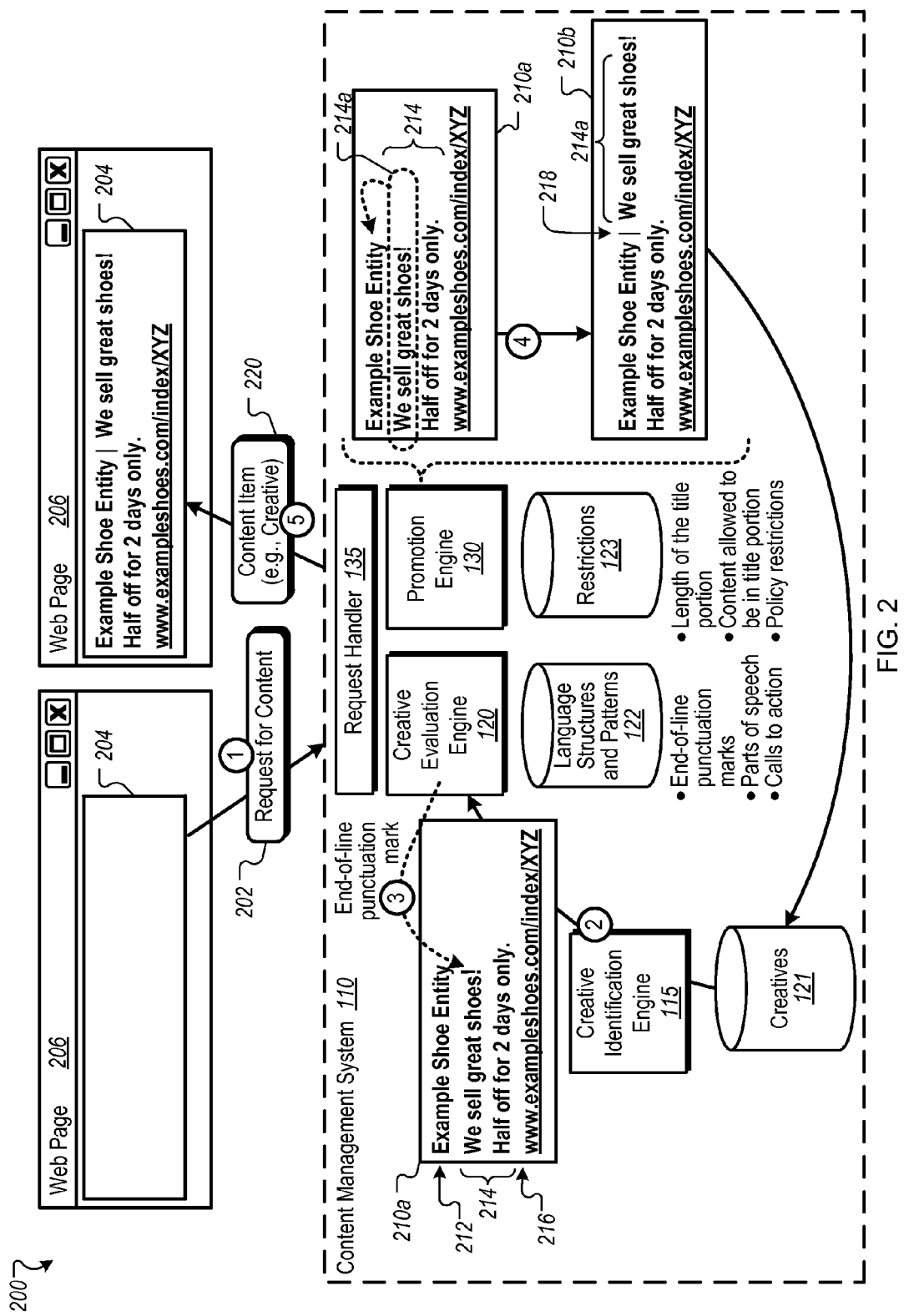
FIG. 2 shows an example system for promoting content in a creative.

FIG. 2 shows an example system 200 for promoting content in a creative. For example, the creative can be provided by the content management system 110 to the device 106, as described above with reference to FIG. 1. One example sequence of steps is now shown using the system 200. Other sequences are possible.

In some implementations, the content management system 110 can receive a request for content 202 at step 1. For example, the request for content 202 can be a request to fill a content item slot 204 (e.g., an advertisement slot on a web page 206). In another example, the request for content 202 can be a request for search results (e.g., search results 118) that are response to a search query (e.g., the query 116). Other forms of requests are possible, such as requests for directions, requests for a map, requests for information, etc.

In an example which does not use a request for content, a background process can execute and invoke components of the system to create or update creatives 121, e.g., including promoting a portion of content in the creative (such as the second line of a selected creative 121 to the title line of the creative).

At step 2, a creative 210a is identified for processing. For example, the creative 210a that is identified can be an advertisement creative that the content management system 110 identifies as associated with an eligible content item (e.g., responsive to the request for content 202) or that the content management system 110 selects in response to the request for content 202. In another example, the creative 210a can be a first or next creative to be processed e.g., such as in a batch of creatives that are being updated to promote content (e.g., second lines of text) to the titles.

The creative 210a (e.g., an advertisement for an example shoe entity) can include plural portions, such as, but not limited to, a title portion 212 (e.g., "Example Shoe Entity"), a body portion 214, and a reference portion 216. In some implementations, the body portion 214 can include two lines of text. In this example, the body portion 214 includes the second and third lines of text within the creative 210a, e.g., "We sell great shoes!" and "Half off for 2 days only." The reference portion 216, for example, can include a reference to a website for the example shoe entity (e.g., www.exampleshoes.com) or a reference to a resource associated with the example shoe entity (e.g., to an online order form).

At step 3, the creative 210a is evaluated, e.g., by the creative evaluation engine 120. For example, the evaluation can include evaluating the body portion 214 to determine when the body portion 214 includes content (e.g., one or more words, a phrase or sentence) that can be added to the title portion 212. In some implementations, the evaluation includes determining whether the text of the body portion 214 constitutes a sentence. In this example, the one or more words that are included in the body portion 214 and that can be promoted are the four words that comprise a second line 214a (e.g., the complete sentence "We sell great shoes!") which is also the entire second line of the creative 210a. In some implementations, the creative evaluation engine 120 can use information from the language structures and patterns 122, e.g., that identifies a domain of possible end-of-line punctuation marks (e.g., a period, exclamation point, question mark, or other punctuation mark(s)). In some implementations, more than one punctuation mark can characterize the end of a line, such as an exclamation point (or one or more other end-of-line punctuation mark) followed by one or more single or double quotes (e.g., "'We sell great shoes!'"). In some implementations, the creative evaluation engine 120 can account for spaces that appear after a non-space end-of-line punctuation mark. In some implementations, parts of speech can be used in evaluating content that may be promoted. For example, a line that ends with a preposition is not likely to be a complete sentence and therefore may by itself not be a good candidate for promotion.

In some implementations, the evaluation can include determining, during the evaluation of the body portion, a likelihood that the body portion includes a first line of text that constitutes a sentence. For example, a decision can be made to promote the first line of text when the likelihood is above a pre-determined threshold (e.g., 95% chance that the first line of text is a sentence). In some implementations, different thresholds can be used for creatives of different content sponsors 108.

In some implementations, the creative evaluation engine 120 may determine that the one or more words embody a call to action associated with the creative. Examples of a call to action include "Check out today's sales," "Try our great fitting styles," "Attend our daily podcast," "Customize your environment" or other attention-grabbing phrases or sentences that request the user perform some action. In some implementations, the creative evaluation engine 120 can use a dictionary of terms, including verbs, that are likely to be imperative commands or requests used in a call to action. When detected, calls to action can be promoted into the title portion.

In some implementations, when evaluating the body portion 214 to determine the content (e.g., one or more words)

that can be promoted, the creative evaluation engine 120 can determine whether the promotion would violate one or more predetermined restrictions (e.g., restrictions 123). For example, the creative evaluation engine 120 can make a determination not to promote the one or more words when they are on a predetermined restriction list or blacklist.

Another example restriction can be related to the length of the title portion 212. For example, if the combined length of the existing title portion 212 ("Example Shoe Entity") and the one or more words to be promoted (e.g., "We sell great shoes!") would exceed the horizontal space available in the content item slot 204, then the creative evaluation engine 120 can decide not to promote. In some implementations, a threshold size that the creative evaluation engine 120 uses to decide whether or not to promote can be based on the number of characters in the title portion 212 that would result once the candidate promoted content (e.g., one or more words) are promoted. In some implementations, the restriction-based decisions based on the length of the title portion 212 can account for any characters (e.g., spaces, vertical lines, or delimiters) that are to be inserted between the original title portion 212 and the content to be promoted.

Other example restrictions used by the creative evaluation engine 120 can relate to the type of content that should not be included in the title portion 212 (e.g., certain words or phrases) and policy restrictions (e.g., a policy that designates that trademark names are not to appear on the first line of a creative). For example, the creative evaluation engine 120 can evaluate text at the beginning, middle, or anywhere within the second line of the creative to identify one or more words that may violate a restriction. In some implementations, each content sponsor 108 can have defined for it content- and policy-related restrictions that are unique to that content sponsor 108. For example, the "Example Shoe Entity" may have a policy (e.g., identified in an advertising campaign by the content sponsor 108) to avoid the promotion of particular trademark terms into the first line of the creative. In another example, a different entity may have no restrictions on trademark terms, but may have restrictions based on the specific content or type of content that should not be promoted.

In some implementations, the creative evaluation engine 120 can decide among multiple kinds of promotion, e.g., whether to promote all or a portion of the second line 214a of the creative or the third line of the creative or the reference portion 216. In some implementations, the information that the creative evaluation engine 120 uses to decide among multiple kinds of promotion can be learned over time, e.g., based on metrics for user engagements with content, such as clicks. For example, the metrics may identify the scenarios in which it is more advantageous to promote the reference portion (e.g., the visible URL) versus the second line of the creative. Other criteria can be used to decide which content is to be promoted.

At step 4, if the creative evaluation engine 120 determines that content (e.g., one or more words) are to be promoted, then the promotion engine 130, for example, can promote the one or more words (e.g., "We sell great shoes!") into the title portion 212. In this example, the result of the promotion is in the creative 210b, in which the title portion 212 has been modified to be "Example Shoe Entity We sell great shoes!" As a result, the creative 210b includes three lines, where the original title portion 212 and first line of the body portion 214 have been combined, with a delimiter 218 separating the two portions.

At step 5, the creative 210b is provided, including the title portion 212, e.g. with the promoted content. In the example using the request for content 202 to fill the content item slot 204, step 5 can occur, for example, when the content management system 110 provides a content item 220 (e.g., the creative 210b) in response to the request for content 202. If for some reason no promotion occurred, e.g., when the creative evaluation engine 120 failed to identify one or more words to promote and/or when restrictions prevented the promotion, then the content item 220 provided by the content management system 110 can be the original four-line creative 210a. Providing the creative 210b can include presenting it to the user along with responsive results or providing the creative to a content sponsor for approval.

In some implementations, instead of (or in addition to) providing the creative in response to a request for content, the creative can be stored. For example, storing the creative with one or more words promoted to the title portion can be part of a background or batch process that updates several creatives at once. In another example, once a modified creative is provided in response to a single request for content, then the creative can be stored, e.g., for a subsequent similar requests for content from other users. In some implementations, storing the creative (or providing the creative in response to a request for content) can include providing estimated performance information for the creative. For example, the estimated performance information can include metrics that identify and compare the performance of the creative with and without promotion. In some implementations, the estimated performance information for the creative can include providing a relative performance change projection, e.g., a numerical projection that indicates that the creative is likely to perform a certain percentage better with content promoted to the title portion than without promotion.

FIG. 3A is a flowchart of an example process 300 for promoting one or more words in a creative. In some implementations, the content management system 110 and/or its subordinate components can perform steps of the process 300 using instructions that are executed by one or more processors. FIGS. 1-2 are used to provide example structures for performing the steps of the process 300. In some implementations, the process 300 can be initiated, for example, when the content management system 110 receives the request for content 202, as described above with respect to FIG. 2.

A creative is identified for processing, where the creative includes a title portion, a body portion and optionally a reference portion (302). For example, the content management system 110 can identify the creative 210a, e.g., a creative associated with an advertisement for shoes. In some implementations, identification of the creative 210a can occur subsequent to receipt by the content management system 110 of a request for content (e.g., the request for content 202 that is related to shoes). For example, the creative 210a that is identified by the content management system 110 can be associated with an eligible content item or a selected content item (e.g., an advertisement for shoes) that is in response to the request for content 202. In this example, the creative includes the title portion 212 (e.g., "Example Shoe Entity"), two lines in the body portion 214 (e.g., "We sell great shoes!" and "Check out today's sales"), and the reference portion 216 (e.g., www.exampleshoes.com).

The body portion is evaluated, including determining when the body portion includes one or more words that can be added to the title portion (304). For example, the creative evaluation engine 120 can evaluate the body portion 214, to determine if the second line of text (e.g., "We sell great shoes!") constitutes a sentence. The determination can be made, e.g., based on whether the second line of text ends in an end-of-line punctuation mark (e.g., a period, question mark, or exclamation mark) and/or whether the one or more words embody a definable concept (e.g., based on language constructs of subject, verb, noun, etc.). As it is the case that the second line ends in an end-of-line punctuation mark (e.g., an exclamation point), the creative evaluation engine 120 can determine that the entire second line (e.g., "We sell great shoes!") is to be promoted. In some implementations, the complete sentence and/or the one or more words that are identified to be promoted can be a subset of the second line. In some implementations, the one or more words that are identified to be promoted can span multiple lines.

In some implementations, the creative evaluation engine 120 can evaluate text in the third line to determine when the second line constitutes a sentence and thereafter promote the second line into the title portion when the second line constitutes a sentence. For example, if the third line begins with a capital letter, then the second line may be determined to be more likely to be a sentence (e.g., even without including an end-of-line punctuation mark). In some implementations, if the third line begins with a lowercase letter, then it may be concluded that the second line does not constitute a complete sentence. Other signals can be used to make a determination whether a promotable word, sentence or phrase (or other content in the body portion or reference portion) can be promoted.

In some implementations, the creative evaluation engine 120 can determine whether promotion should occur, e.g., by evaluating one or more metrics associated with the creative or delivery of the creative. For example, one metric can relate to a location of where the creative is to be served, e.g., the country in which the user currently resides. In some implementations, the user's location can be determined using global positioning system (GPS) capabilities of the user's mobile device, by location information provided by the user (e.g., an address provided by the user in a user profile), or in other ways. In some implementations, content sponsors can specify that promotion of content in their content items is not to occur in certain countries or in other situations specified by the content sponsor.

In some implementations, another metric can relate to a user to whom the creative is to be displayed. For example, promotion may not occur if the language of the user is Chinese, Japanese or Korean or some other language, e.g., for which it has been determined that promotion of content to the title portion does not result in better performance (e.g., increased click-throughs, etc.).

Some implementations can use a metric that relates to an environment associated with the serving of the creative. For example, for non-mobile devices (e.g., home personal computers), it may be been determined that users prefer that promotion does not occur. However, users of mobile devices may generally prefer that promotion does occur. In some implementations, the decision to promote or not promote based on environment can be based, at least in part, on statistics derived from historical user engagements for content that is provided with and without promoted content.

Some implementations can include metrics that relate to the creative's performance, e.g., on a creative-by-creative basis. For example, performance-related metrics can indicate a relative projected or predicted performance of the creative with and without content added to the title portion. In some implementations, if it is determined that promoting the content is likely to cause the creative to perform at least slightly better than the creative without promoting, then promotion can occur.

The one or more words are promoted into the title portion (306). For example, the promotion engine 130 can promote the second line 214a (e.g., "We sell great shoes!") that was identified by the creative evaluation engine 120 as constituting a sentence. In some implementations, promoting the one or more words into the title portion can be accomplished by appending the one or more words to the end of the title portion. For example, promotion of the second line 214a can be to the title portion 212, e.g., transforming the title portion to "Example Shoe Entity|We sell great shoes!" as shown in the creative 210b.

In some implementations, promotion can include adding a delimiter to the title portion between text of the title portion and the promoted content (e.g., one or more words). For example, the creative 210b includes the delimiter 218 that separates the original title portion 212 from the one or more words promoted from the second line 214a.

In some implementations, the act of promotion can include constructing a link for the title portion after promotion. For example, the link that is constructed can be a shortened version of a reference to the resource (e.g., a URL) that appears in the reference portion 216 of the creative. In some implementations, the link that is constructed in the title portion during promotion can be directed to a first resource (e.g., www.exampleshoes.com), and the reference portion can be directed to a second different resource (e.g., www.example-shoes.com/index/XYZ). For example, it may be determined that users are more likely to click on the shortened URL. In some implementations, the link that is constructed is anchor text for the resource set forth in the reference portion.

The creative is provided that includes the title portion with the promoted one or more words (308). For example, the content management system 110 can provide the creative 210b in which the second line 214a has been promoted to the title portion 212. In some implementations, e.g., in response to the request for content 202, other content (e.g., search results or a resource) and the creative can be provided responsive to the request. For example, the request handler 135 can provide the creative 210b to fill the content item slot 204. As a result, the creative that is displayed on the web page 206 can be the three-line creative 210b (e.g., with content promoted to the title) rather than the four-line creative 210a (e.g., without promoted content). In some implementations, instead of (or in addition to) providing the creative in response to the request for content 202, the content management system 110, for example, can store the creative 210b, e.g., in the creatives 121.

Figure 3B:
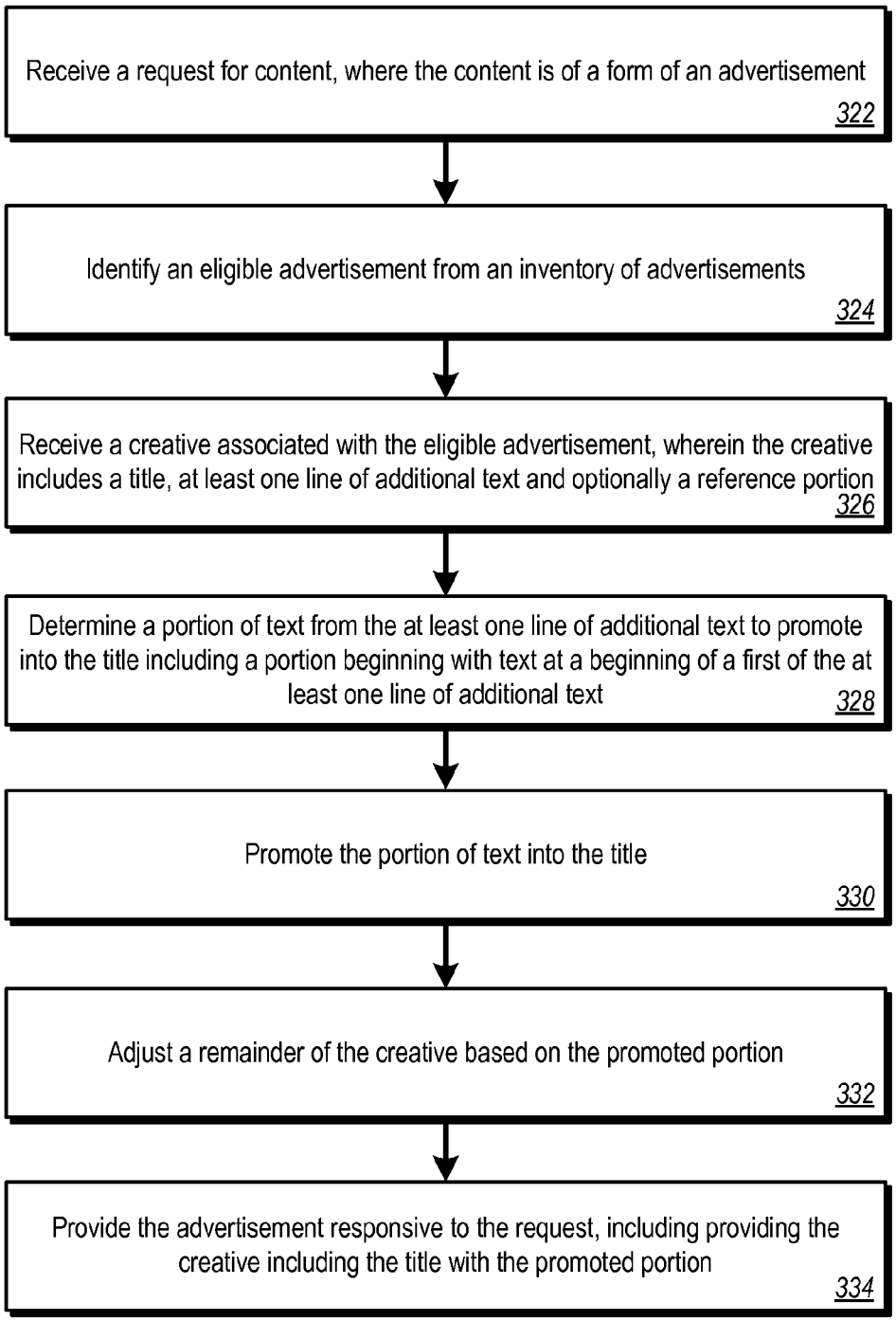
FIG. 3B is a flowchart of an example process for providing a content item with promoted text in response to a request for content.

FIG. 3B is a flowchart of an example process 320 for providing an advertisement with promoted text in response to a request for content. For example, the advertisement that is provided can be associated with a creative in which a portion of text has been promoted to the creative's title, e.g., from an additional line of text in the creative. In some implementations, the content management system 110 and/or its subordinate components can perform steps of the process 320 using instructions that are executed by one or more processors. FIGS. 1-2 are used to provide example structures for performing the steps of the process 320.

A request for content is received, where the content is of a form of an advertisement (322). For example, the content management system 110 or request handler 135 can receive the request for content 202 from the web page 206, e.g., to fill the content item slot 204. In some implementations, the web page 206 can be a browser, and the request for content 202 can be related to the user's search query (e.g., "fashionable shoes") in the browser. For example, the request for content 202 can be a request for a shoe-related advertisement because the user's search query is related to shoes.

An eligible advertisement is identified from an inventory of advertisements (324). For example, the request handler 135 can identify an advertisement related to shoes, e.g., the advertisement being associated with the creative 210a. The advertisement may be selected from several eligible content items (e.g., several different advertisements for shoes) that are responsive to the request for content 202.

In some implementations, promotion of content can be used to reduce the size of a content item (e.g., an advertisement) that is otherwise too large to fit into a content item slot (e.g., an advertisement slot). For example, the second line of a four-line advertisement can be promoted to the title portion to create a three-line advertisement. Promotion can be used in other ways to save space used by a content item and/or to make the content item more compact.

A creative is received that is associated with the eligible advertisement, where the creative includes a title, at least one line of additional text, and a optionally a reference portion (326). For example, the creative identification engine 115 can identify, from the creatives 121, the creative 210a that corresponds to the advertisement for shoes identified by the request handler 135. The creative 210a can include, for example, the title portion 212 (e.g., "Example Shoe Entity" that can identify a particular shoe store or website), the body portion 214 (e.g., including at least one line of descriptive text regarding shoes), and the reference portion 216 (e.g., including a reference to a resource for a specific brand of shoes sold by the shoe entity, such as www.exampleshoes.com/index/XYZ).

A portion of text is determined from the at least one line of additional text to promote into the title including a portion beginning with text at a beginning of a first of the at least one line of additional text (328). For example, the creative evaluation engine 120 can determine that the first line of the body portion 214 (e.g., "We sell great shoes!") constitutes a sentence. The determination can be made, for example, because "We sell great shoes!" ends in exclamation point (as in this example) or with some other end-of-line punctuation mark (e.g., a period or question mark). Other signals can be used to determine the portion of text to be promoted.

The portion of text is promoted into the title (330). For example, the promotion engine 130 can promote the second line 214a to the title portion 212.

A remainder of the creative is adjusted based on the promoted portion (332). As an example, as part of the promotion process, the promotion engine can modify the creative 210b, e.g., to make the creative a three-line creative, as opposed to simply leaving the second line blank from which the second line 214a was promoted.

In some implementations, content can be promoted into the space created by promoting the second line. For example, content from somewhere else in the creative other than the title portion 212 can be promoted into the now vacant position (or other content that was not originally included in the creative).

The advertisement is provided responsive to the request, including providing the creative including the title with promoted portion (334). As an example, the request handler 135 can provide the content item 220 in response to the request for content 202. The content item 220 that is provided, for example, can be the creative 210b in which the second line 214a has been promoted to the title portion 212. In some implementations, instead of (or in addition to) providing the creative in response to a request for content, the content management system 110, for example, can store the creative 210b in the creatives 121.

FIG. 3C is a flowchart of an example process 340 for providing a creative with promoted text. For example, the creative that is provided can be a creative in which a second line of text in the creative has been promoted to the creative's title. In some implementations, the content management system 110 and/or its subordinate components can perform steps of the process 340 using instructions that are executed by one or more processors. FIGS. 1-2 are used to provide example structures for performing the steps of the process 340.

A creative is received that is associated with an advertisement, where the creative includes a title, a second line of text, a third line of text, and optionally a reference portion (342). For example, the content management system 110 can receive the creative 210a for processing that has been identified by the creative identification engine 115. Identification can occur, for example, as a response to the request for content 202 or if the content management system 110 executes a process to update one or several creatives 121. The title portion 212 of the creative 210a can contain the title of the advertisement, while the body portion 214 can include the second and third lines of text.

A determination is made regarding when the second line of text can be promoted into the title, including determining when the second line of text constitutes a sentence (344). As an example, the creative evaluation engine 120 can determine whether the second line of text (e.g., first line of the body portion 214) constitutes a complete sentence and is promotable, including or in light of the restrictions described above.

The second line of text is promoted into the title when the second line of text constitutes a sentence, and the title is modified to append the second line of text to the title (346). For example, the promotion engine 130 can promote the second line 214a to the title portion 212.

The creative, including the title with promoted second line of text, is provided (348). As an example, the request handler 135 can provide the creative 210b as the content item 220 in response to the request for content 202. In this example, the second line 214a of the creative 210b has been promoted to the title portion 212. In some implementations, instead of (or in addition to) providing the creative in response to a request for content, the content management system 110, for example, can store the creative 210b in the creatives 121.

Figure 4:
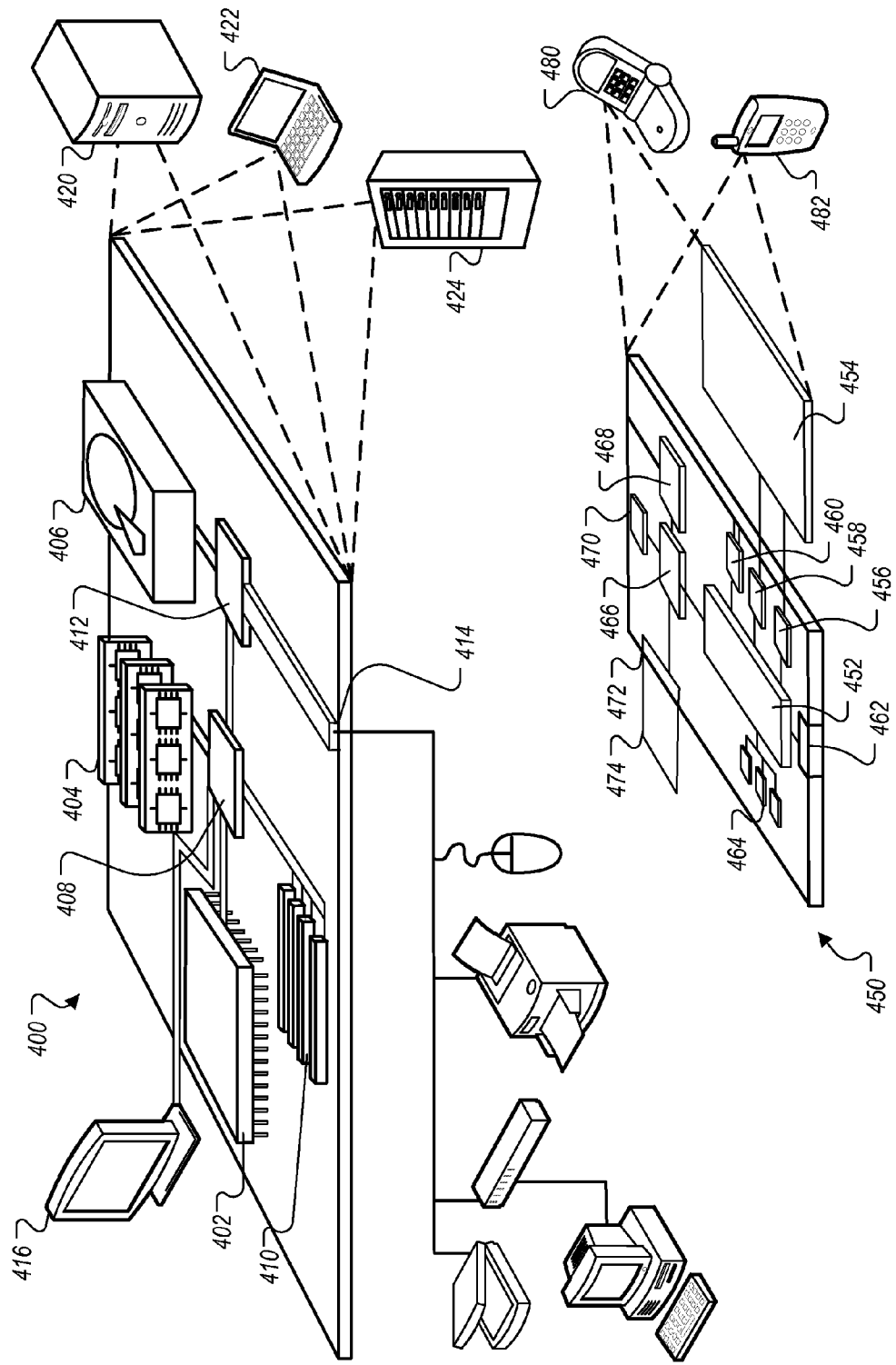
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    identifying, using one or more processors, a creative for processing, the creative including a title portion, a body portion and optionally a reference portion, wherein the title portion constitutes a first line of text, and the body portion includes second and third lines of text;
    evaluating the body portion including determining when the body portion includes one or more words that can be added to the title portion, wherein evaluating the body portion includes evaluating either or both of the second and the third line of text to identify the one or more words;
    promoting, using the one or more processors, the one or more words into the title portion; and
    providing the creative including the title portion with the promoted one or more words.

2. The method of claim 1 further comprising receiving a request for content, and providing the creative responsive to the request.

3. The method of claim 1 wherein evaluating the body portion includes evaluating the second line of text to identify the one or more words.

4. The method of claim 3 wherein evaluating the second line includes identifying when the second line of text constitutes a sentence and promoting the second line into the title portion when the second line constitutes a sentence.

5. The method of claim 3 wherein evaluating the body portion includes evaluating text in the second or third line to determine when the second line constitutes a sentence and promoting the second line into the title portion when the second line constitutes a sentence.

6. The method of claim 3 wherein evaluating the second line includes determining when the second line ends with an end-of-line punctuation mark, and when so, promoting the entire second line into the title portion.

7. The method of claim 1 wherein promoting the one or more words into the title portion includes appending the one or more words to the end of the title portion.

8. The method of claim 7 wherein promoting the one or more words further includes adding a delimiter to the title portion between text of the title portion and the promoted one or more words.

9. The method of claim 8 wherein the delimiter separates the text of the title portion from the promoted one or more words.

10. The method of claim 1 wherein promoting the one or more words includes constructing a link for the title portion after promotion.

11. The method of claim 10 wherein the link is directed to a first resource.

12. The method of claim 11 wherein the reference portion is directed to a second different resource.

13. The method of claim 1 wherein the one or more words are a phrase.

14. The method of claim 1 wherein the one or more words embody a concept.

15. The method of claim 1 wherein the one or more words embody a call to action associated with the creative.

16. The method of claim 1 wherein providing includes storing the creative.

17. The method of claim 1 wherein providing includes providing the creative responsive to a received request for a creative to fill a slot.

18. The method of claim 1 wherein evaluating the body portion includes evaluating text of the body portion at a beginning of the body portion for promotion.

19. The method of claim 1 wherein evaluating the body portion includes evaluating text of the body portion at a location other than a beginning of the body portion for promotion.

20. The method of claim 1 wherein evaluating the body portion includes determining when, if promoted, the one or more words would violate one or more predetermined restrictions on promotion and not promoting the one or more words if a violation would occur.

21. The method of claim 20 wherein one predetermined restriction relates to a length of the title portion.

22. The method of claim 20 wherein one predetermined restriction relates to content that can be included in the title portion.

23. The method of claim 20 wherein one predetermined restriction relates to policy restrictions.

24. The method of claim 1 further comprising determining when promotion should occur including evaluating one or more metrics associated with the creative or delivery of the creative.

25. The method of claim 24 wherein one metric relates to a location of where the creative is to be served.

26. The method of claim 24 wherein one metric relates to a user to whom the creative is to be displayed.

27. The method of claim 24 wherein one metric relates to an environment associated with the serving of the creative.

28. The method of claim 24 wherein one metric relates to a relative projected performance of the creative with and without content added to the title portion.

29. The method of claim 1 wherein providing the creative includes providing estimated performance information for the creative.

30. The method of claim 29 wherein providing the estimated performance information for the creative includes providing a relative performance change projection.

31. The method of claim 1 wherein evaluating the body portion includes determining a likelihood that the body portion includes a first line of text that constitutes a sentence, and promoting the first line of text when the likelihood is above a first threshold.

32. A computer-implemented method comprising:
receiving, using one or more processors, a request for content, wherein the content is of a form of an advertisement;
identifying an eligible advertisement from an inventory of advertisements;
receiving a creative associated with the eligible advertisement wherein the creative includes a title, at least one line of additional text and optionally a reference portion;
determining a portion of text from the at least one line of additional text to promote into the title including a portion beginning with text at a beginning of a first of the at least one line of additional text, wherein determining includes evaluating the at least one line of additional text to identify the portion;
promoting, using the one or more processors, the portion of text into the title;
adjusting a remainder of the creative based on the promoted portion; and
providing the advertisement responsive to the request including providing the creative including the title with the promoted portion.

33. The method of claim 32 wherein the at least one line of additional text includes two lines of text.

34. The method of claim 33 wherein the title constitutes a first line of text of the advertisement, and the at least one line of additional text includes second and third lines of text of the advertisement, and wherein determining a portion of text from the at least one line of additional text to promote into the title includes evaluating the one or both of the second and third lines of text to identify the portion of text.

35. The method of claim 34 wherein determining the portion of text from the at least one line of additional text to promote into the title includes identifying when the second line of text constitutes a sentence and promoting the second line into the title when the second line constitutes a sentence.

36. The method of claim 34 wherein determining a portion of text from the at least one line of additional text to promote into the title includes evaluating text in the third line to determine when the second line constitutes a sentence and promoting the second line into the title when the second line constitutes a sentence.

37. The method of claim 34 wherein evaluating the second line includes determining when the second line ends with an end-of-line punctuation mark, and when so, promoting the entire second line into the title.

38. The method of claim 32 wherein promoting the portion of text into the title includes appending the portion of text to the end of the title.

39. The method of claim 38 wherein promoting the portion of text further includes adding a delimiter to the title between text of the title and the promoted portion of text.

40. The method of claim 39 wherein the delimiter separates the text of the title from the promoted portion of text.

41. The method of claim 32 wherein promoting the portion of text includes constructing a link for the title after promotion.

42. The method of claim 41 wherein the link is directed to a first resource.

43. The method of claim 42 wherein the reference portion is directed to a second different resource.

44. The method of claim 32 wherein the portion of text is a phrase.

45. The method of claim 32 wherein the portion of text embodies a concept.

46. The method of claim 32 wherein the portion of text embodies a call to action associated with the advertisement.

47. The method of claim 32 wherein providing includes storing the advertisement.

48. The method of claim 32 wherein providing includes providing the advertisement responsive to a received request for a creative to fill a slot.

49. The method of claim 32 wherein determining a portion of text from the at least one line of additional text to promote into the title includes evaluating the at least one line of additional text at a beginning of the at least one line of additional text for promotion.

50. The method of claim 32 wherein determining a portion of text from the at least one line of additional text to promote into the title includes evaluating the at least one line of additional text at a location other than a beginning of the at least one line of additional text for promotion.

51. The method of claim 32 wherein evaluating the at least one line of additional text includes determining when, if promoted, the portion of text would violate one or more predetermined restrictions on promotion and not promoting the portion of text if a violation would occur.

52. The method of claim 51 wherein one predetermined restriction relates to a length of the title.

53. The method of claim 51 wherein one predetermined restriction relates to content that can be included in the title.

54. The method of claim 51 wherein one predetermined restriction relates to policy restrictions.

55. The method of claim 32 further comprising determining when promotion should occur including evaluating one or more metrics associated with the advertisement or delivery of the advertisement.

56. The method of claim 55 wherein one metric relates to a location of where the advertisement is to be served.

57. The method of claim 55 wherein one metric relates to a user to whom the advertisement is to be displayed.

58. The method of claim 55 wherein one metric relates to an environment associated with the serving of the advertisement.

59. The method of claim 55 wherein one metric relates to a relative projected performance of the advertisement with and without content added to the title.

60. The method of claim 32 wherein providing the advertisement includes providing estimated performance information for the advertisement.

61. The method of claim 60 wherein providing the estimated performance information for the advertisement includes providing a relative performance change projection.

62. The method of claim 32 wherein evaluating the at least one line of additional text includes determining a likelihood that the at least one line of additional text includes a first line of text that constitutes a sentence, and promoting the first line of text when the likelihood is above a first threshold.

63. A computer-implemented method comprising:

receiving a creative associated with an advertisement wherein the creative includes a title, and one or more lines of text including a second line of text and optionally a reference portion;

determining, using one or more processors, when the second line of text can be promoted into the title including determining when the second line of text constitutes a sentence by evaluating the text included in the one or more lines of text;

promoting, using the one or more processors, the second line of text into the title when the second line of text constitutes a sentence including modifying the title to append the second line of text to the title; and providing the creative including the title with the promoted second line of text.

64. The method of claim 63 further comprising receiving a request for content, and providing the creative responsive to the request.

65. The method of claim 63 wherein the one or more lines of text comprise a body portion that includes two lines of text.

66. The method of claim 65 wherein the title constitutes a first line of text, and the body portion includes second and third lines of text, and wherein evaluating the body portion includes evaluating the second line of text to identify the sentence.

67. The method of claim 66 wherein evaluating the second line includes identifying when the second line of text constitutes a sentence and promoting the second line into the title when the second line constitutes a sentence.

68. The method of claim 66 wherein evaluating the body portion includes evaluating text in the third line to determine when the second line constitutes a sentence and promoting the second line into the title when the second line constitutes a sentence.

69. The method of claim 65 wherein evaluating the second line includes determining when the second line ends with an end-of-line punctuation mark, and when so, promoting the entire second line into the title.

70. The method of claim 63 wherein promoting the second line of text into the title includes appending the sentence to the end of the title.

71. The method of claim 70 wherein promoting the second line of text further includes adding a delimiter to the title between text of the title and a promoted sentence.

72. The method of claim 71 wherein the delimiter separates the text of the title from the promoted sentence.

73. The method of claim 63 wherein promoting the second line of text includes constructing a link for the title after promotion.

74. The method of claim 73 wherein the link is directed to a first resource.

75. The method of claim 74 wherein the reference portion is directed to a second different resource.

76. The method of claim 63 wherein the second line of text is a phrase.

77. The method of claim 63 wherein the sentence embodies a concept.

78. The method of claim 63 wherein the sentence embodies a call to action associated with the creative.

79. The method of claim 63 wherein providing includes storing the creative.

80. The method of claim 63 wherein providing includes providing the creative responsive to a received request for a creative to fill a slot.

81. The method of claim 65 wherein evaluating the text includes evaluating text of the body portion at a beginning of the body portion for promotion.

82. The method of claim 65 wherein evaluating the text includes evaluating text of the body portion at a location other than a beginning of the body portion for promotion.

83. The method of claim 65 wherein evaluating the text includes determining when, if promoted, the sentence would violate one or more predetermined restrictions on promotion and not promoting the sentence if a violation would occur.

84. The method of claim 83 wherein one predetermined restriction relates to a length of the title.

85. The method of claim 83 wherein one predetermined restriction relates to content that can be included in the title.

86. The method of claim 83 wherein one predetermined restriction relates to policy restrictions.

87. The method of claim 63 further comprising determining when promotion should occur including evaluating one or more metrics associated with the creative or delivery of the creative.

88. The method of claim 87 wherein one metric relates to a location of where the creative is to be served.

89. The method of claim 87 wherein one metric relates to a user to whom the creative is to be displayed.

90. The method of claim 87 wherein one metric relates to an environment associated with the serving of the creative.

91. The method of claim 87 wherein one metric relates to a relative projected performance of the creative with and without content added to the title.

92. The method of claim 63 wherein providing the creative includes providing estimated performance information for the creative.

93. The method of claim 92 wherein providing the estimated performance information for the creative includes providing a relative performance change projection.

94. The method of claim 65 wherein evaluating the text includes determining a likelihood that the body portion includes a first line of text that constitutes a sentence, and promoting the first line of text when the likelihood is above a first threshold.

95. A content management system including:
- an identification engine that identifies a content item for processing, the content item including a title portion, a body portion and optionally a reference portion, wherein the title portion constitutes a first line of text, and the body portion includes second and third lines of text;
- an evaluation engine that evaluates the body portion, including determining when the body portion includes one or more words that can be added to the title portion, wherein evaluating the body portion includes evaluating either or both of the second and the third line of text to identify the one or more words;
- a promotion engine that promotes the one or more words into the title portion; and
- a request handler for providing the content item in response to a request for content by the user.

96. The system of claim 95 wherein the content item is an advertisement creative.

* * * * *